United States Patent
Ying et al.

(10) Patent No.: US 6,210,649 B1
(45) Date of Patent: Apr. 3, 2001

(54) METAL OXIDE CATALYSTS FOR NITRIC OXIDE REDUCTION

(75) Inventors: Jackie Y. Ying, Winchester; Mark D. Fokema, Somerville, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/060,633

(22) Filed: Apr. 15, 1998

Related U.S. Application Data

(60) Provisional application No. 60/042,231, filed on Apr. 15, 1997.

(51) Int. Cl.[7] ............ C01B 21/02; C01B 21/22; C01B 21/24
(52) U.S. Cl. ............ 423/351; 423/239.1; 423/402; 502/302; 502/303
(58) Field of Search ............ 502/303; 423/239.1, 423/402, 351

(56) References Cited

U.S. PATENT DOCUMENTS

| | | | | |
|---|---|---|---|---|
| 5,607,892 | * | 3/1997 | Chopin et al. | 502/303 |
| 5,660,809 | * | 8/1997 | Costa et al. | 423/592 |
| 5,855,862 | * | 1/1999 | Grenier et al. | 423/605 |
| 5,876,681 | * | 3/1999 | Barthe et al. | 423/239.1 |
| 5,919,425 | * | 7/1999 | Nguyen et al. | 423/239.1 |
| 5,922,295 | * | 7/1999 | Chattha et al. | 423/239.1 |

OTHER PUBLICATIONS

Zhang, Xiankuan; Walters, Arden B.; Vannice, M. Albert, "$N_{ox}$ Decomposition and Reduction by Methane Over $La_2O_3$", Applied Catalysis B; Environmental, v. 4, n 2–3 (Sep. 13, 1994), p. 237–256.*

X. Zhang et al., "No Adsorption, Decomposition, and Reduction by Methane over Rare Earth Oxides", Journal of Catalysis, vol. 155, pp. 290–302, 1995.

* cited by examiner

*Primary Examiner*—Wayne Langel
(74) *Attorney, Agent, or Firm*—Wolf, Greenfield & Sacks, P.C.

(57) ABSTRACT

The invention relates to compositions of matter that can be used in $NO_x$ reduction. The compositions include non-zeolitic materials such as Group IIIB metal oxides which have high surface areas to promote high catalytic activity. In particular, the compositions have high surface areas comprise agglomerates of nanocrystalline metal oxide particles. The invention also provides methods for making these compositions and for using these compositions to reduce $NO_x$ compounds without a need for toxic reducing agents such as ammonia.

9 Claims, 5 Drawing Sheets

METAL OXIDE CATALYSTS FOR NITRIC OXIDE REDUCTION

RELATED APPLICATION

This non-provisional application claims the benefit under Title 35, U.S.C. §119(e) of U.S. provisional application Ser. No. 60/042,231, filed Apr. 15, 1997, entitled "Metal Oxide Catalysts for Nitric Oxide Reduction" by Jackie Y. Ying et al., incorporated herein by reference.

This invention was made with government support under Grant No. 9400334DMR awarded by the National Science Foundation. The government has certain rights in the invention.

FIELD OF THE INVENTION

The invention relates to compositions of matter that can be used in $NO_x$ reduction. In particular, the compositions are nanocrystalline metal oxide materials having high surface areas. The invention also provides methods of making these compositions and methods for using these compositions to reduce $NO_x$ compounds.

BACKGROUND OF THE INVENTION

The reduction of nitrogen oxide ($NO_x$) emissions is a key environmental objective for the new millennium. Atmospheric emissions of $NO_x$ not only have detrimental effects on human health, but also have adverse effects on the ecosystems in which we live. Exposure to high levels of $NO_x$ produces immediate acute effects and prolonged exposure above ambient levels leads to bronchitis, pneumonia, susceptibility to viral infections and alterations to the immune system. In addition to these direct health effects, $NO_x$ contributes to urban smog by reacting with volatile organic compounds in the atmosphere to form ozone, and also causes acid precipitation.

The United States anthropogenic $NO_x$ emissions are estimated at 23 million tons for 1992. Despite improved control strategies, this represents a 5% increase since 1983. The sources of $NO_x$ pollutants can be classified into two categories: stationary and non-stationary. Non-stationary sources (motorized vehicles) contributed 45% of the total United States $NO_x$ emissions for 1992. The remaining 55% of the pollutants can be attributed to stationary sources such as power plants (29%), internal combustion engines (11%), industrial boilers (8%), process heaters (3%), gas turbines (1%) and other sources (3%). Since nearly all of these $NO_x$ emissions arise from the combustion of fossil fuels, the development of improved methods by which $NO_x$ can be removed from exhaust gases is of critical importance.

Several catalytic approaches for the removal of $NO_x$ from exhaust gases have been developed in the past few decades. Direct decomposition of $NO_x$ involves the decomposition of $NO_x$ into molecular nitrogen and oxygen, but the current generation of catalysts for this reaction are not active nor robust enough to be applied in practice e.g. the zeolite Cu-ZSM-5. Selective catalytic reduction of $NO_x$ using ammonia as a reducing agent has been industrially applied for several decades, but the use of ammonia leads to high equipment costs due to its corrosive nature, and also gives rise to the phenomenon known as "ammonia slip", where unreacted ammonia is exhausted to the atmosphere. The use of hydrocarbons as reducing agents is favored over ammonia, and many catalytic systems for $NO_x$ reduction with hydrocarbons have been developed. These systems typically employ $C_2$ or higher hydrocarbons.

The large worldwide reserves of natural gas and the availability of methane at gas fired power plants makes methane an attractive reductant for stationary applications. However, over most catalysts methane preferentially reacts with oxygen present in the feed stream before reducing $NO_x$. Some of the few catalysts that do promote $NO_x$ reduction with methane in an oxidizing atmosphere are zeolites such as ZSM-5 or ferrierite zeolites exchanged with Co, Mn, Ni, In, Ga or Pd ions. Near complete conversion of $NO_x$ to $N_2$ is achieved when an excess of methane is used at low space velocities.

Currently, catalysts that do not require an ammonia reductant for $NO_x$ reduction, such as Co-ZSM-5, do not have sufficient catalytic activity for industrial purposes, especially in the presence of water. There exists a need for the development of new materials that do not themselves promote the emission of harmful compounds into the atmosphere.

SUMMARY OF THE INVENTION

The present invention provides new compositions for reducing $NO_x$ compounds, methods for making these compositions and methods for using compositions to reduce $NO_x$ compounds.

One aspect of the invention provides a composition comprising a ceramic having at least one element selected from the group consisting of one or more of transition metals, noble metals, Group IA, Group IIA, Group IIIB, lanthanide, and actinide elements. The ceramic has a surface area of at least about 10 $m^2/g$ and comprises agglomerates of crystallites having a crystallite size of less than about 100 nm.

Another aspect of the invention provides a method for performing X-ray scintillation with $Y_2O_3$ particles which includes a dopant selected from the group consisting of Eu, Gd, and a combination thereof.

Another aspect of the invention provides a method for chemically precipitating a ceramic with a water-soluble base having a general formula $R_4N^+OH^-$.

Another embodiment provides a method for sol-gel processing of an oxide. The oxide is selected from the group consisting of one or more of transition metals, noble metals, Group IA, Group IIA, Group IIIB oxides, lanthanide oxides, actinide oxides, or any combination of these.

Another embodiment provides a method for carrying out an inert gas condensation process. The process involves a doped oxide selected from the group consisting of one or more of transition metals, noble metals, Group IA, Group IIA, Group IIIB oxides, lanthanide oxides, actinide oxides, or any combination of these.

Another aspect of the invention provides a method for synthesizing a ceramic comprising crystallites. The crystallites have a surface area of at least 10 $m^2/g$ and an average crystallite size of less than about 100 nm.

Another aspect of the invention provides a method for calcining a ceramic comprising crystallites where the calcining step occurs at a temperature of 800° C. The method also includes the step of recovering the ceramic having a surface area of at least 10 m$^2$/g and an average crystallite size of less than about 100 nm.

Another aspect of the invention provides a method comprising sintering a ceramic comprising crystallites at a temperature of 800° C. and recovering the ceramic with a theoretical density of at least 90%.

Another aspect of the invention provides a method for performing X-ray scintillation with a sintered ceramic comprising particles having an average particle size of less than about 0.2 µm.

Another aspect of the invention provides a method which includes the steps of exposing an NO$_x$ compound to a ceramic where the ceramic has a surface area of at least 1 0m$^2$/g. An NO$_x$ reduction reaction is then allowed to occur.

One embodiment provides a method for NO$_x$ reduction. The method includes the steps of exposing a ceramic catalyst to NO$_x$ and allowing NO$_x$ to undergo a reduction reaction at an elevated rate defined as a rate scaled, for particular reaction conditions, relative to a rate involved in exposing about 100 mg of ceramic catalyst to about 100 ml/min of about 4000 ppm NO, 4000 ppm CH$_4$ and 4% O$_2$, and allowing NO$_x$ to undergo a reduction reaction at a rate of at least about 2×10$^{-7}$ mol N$_2$/g sec at 700° C.

Another embodiment provides method comprising exposing NO$_2$, NO or N$_2$O to a ceramic having a surface area of at least about 10 m$^2$/g and allowing NO$_x$ reduction to occur.

DETAILED DESCRIPTION

Figure 1:
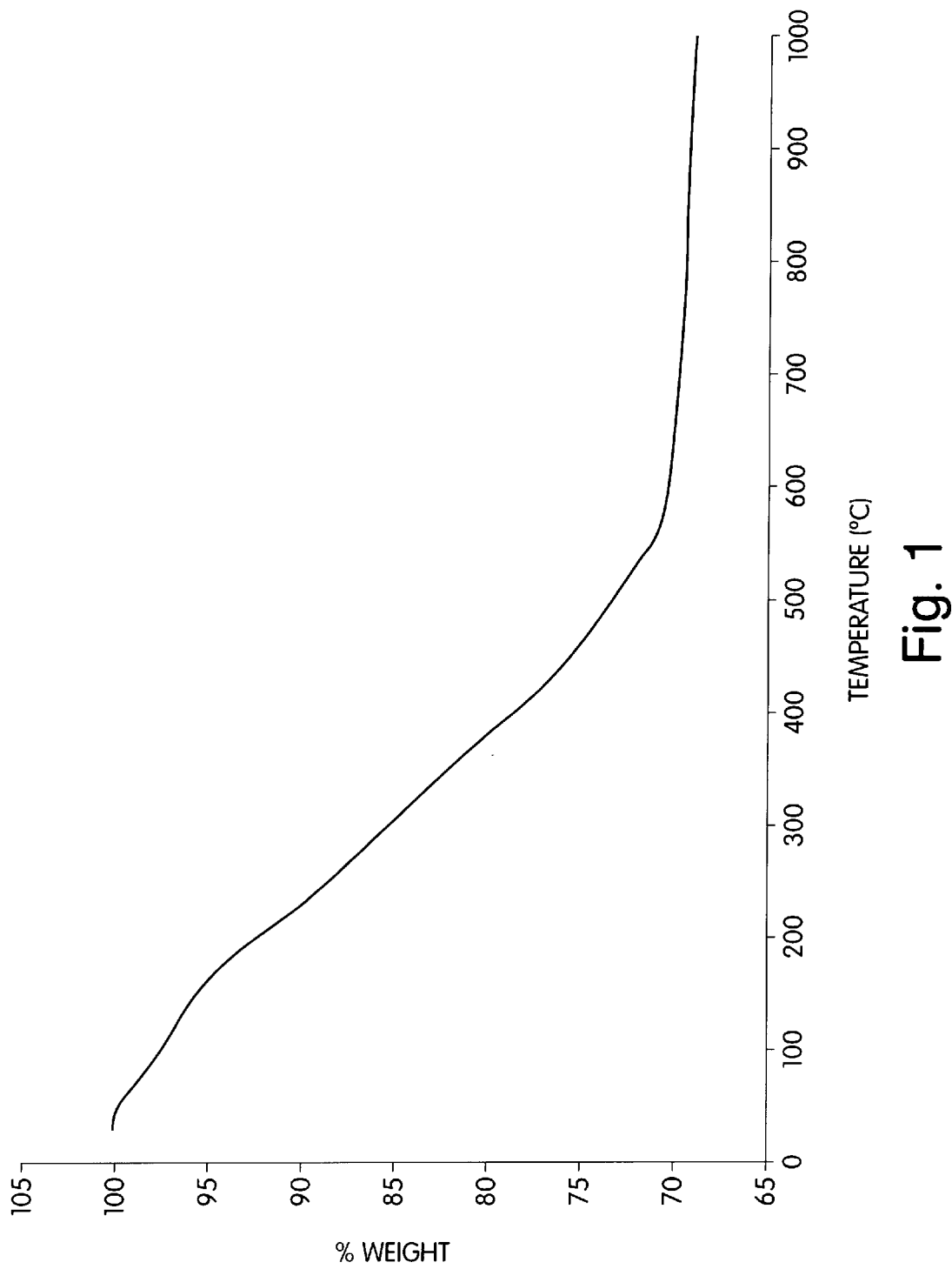
FIG. 1 shows a weight loss curve for trial 1.

One aspect of the invention provides a set of compositions having a high surface area. The compositions can be used as NO$_x$ reduction catalyst supports. High surface areas can result when the composition is a nanocrystalline material. A "nanocrystalline material" or "nanocrystallite" comprises an agglomerate of extremely small particles (crystallites). The crystallites have a crystal size i.e. a mean diameter of less than about 50 nm, preferably less than about 25 nm and more preferably less than about 10 nm. It is a total surface area of the nanocrystalline agglomerates that provide the high surface area of the material. Preferably, the composition has a surface area of at least about 20 m$^2$/g, more preferably at least about 30 m$^2$/g, more preferably at least about 40 m$^2$/g, more preferably at least about 50 m$^2$/g, more preferably at least about 60 m$^2$/g, more preferably at least about 70 m$^2$/g, more preferably at least about 80 m$^2$/g, more preferably at least about 90 m$^2$/g, more preferably at least about 100 m$^2$/g, and more preferably still at least about 150 m$^2$/g. The surface area of the material is roughly inversely proportional to the size of each crystallite. A set of preferred embodiments can include a combination of the above-mentioned dimensions. Preferably the material comprises agglomerates having a surface area of at least about 10 m$^2$/g, wherein at least a portion of the particles in the agglomerate have a mean diameter of no more than 100 nm.

In one embodiment, the composition is a ceramic which can be selected from the group consisting of oxides, nitrides, oxynitrides, carbides, or a combination and also includes at least one metal. The metal can be selected from the group consisting of one or more of a transition metal, noble metal, Group IA metal, Group IIA metal, Group IIIB metal, a lanthanide and an actinide. The ceramic preferably is a metal oxide, more preferably a Group IIIB, lanthanide or actinide oxide, more preferably a Group IIIB metal oxide, more preferably Sc$_2$O$_3$, Y$_2$O$_3$, La$_2$O$_3$, Gd$_2$O$_3$, Eu$_2$O$_3$, Dy$_2$O$_3$, Sm$_2$O$_3$, Lu$_2$O$_3$ and a combination thereof, and more preferably still Sc$_2$O$_3$, Y$_2$O$_3$, or La$_2$O$_3$ and a combination thereof. A preferred set of embodiments comprise ceramics having a surface area of at least 10 m$^2$/g or any of the above-mentioned surface areas.

In another embodiment, the ceramic is a metal oxide, in particular, a non-zeolitic material. A "zeolite" or "zeolitic material" is a silicate (SiO$_2$-containing) of aluminum which can be optionally doped with an ion such as sodium and possesses a framework of channels and pores. In contrast, a "non-zeolitic material" is a non-framework material comprising an agglomerate of nanocrystalline particles free of channels and pores of the zeolite type i.e. substantially free of channels and pores. Thus, the non-zeolitic material is not microporous alumina-silicate, or the like. A catalyst that is a non-zeolitic material presents advantages over zeolitic catalysts. In a zeolitic catalyst, the active portion of a zeolite can be a metal such as Co which is introduced as a cation into the framework. Due to the general hydrothermal instability of zeolites, the zeolitic catalyst can undergo, for example, loss of aluminum ions in the presence of water causing a loss of charge. This loss of charge can result in the loss of the cobalt active sites and thus decreased catalytic activity. The catalytic activity in non-zeolitic catalysts do not arise from individual centers but rather from the surfaces of the nanocrystalline particles in the agglomerates. The non-zeolitic materials of the present invention are thermally stable as evidenced by a very small loss of activity at temperatures of up to 1000° C.

The composition can comprise ceramics which include dopants to produce a doped material. A "dopant" as used herein refers to an new ion type, not present in the original ceramic, that is substituted into the metal oxide in place of an ion originally present in the ceramic. The dopant can be present at a level of from about 0.1 to about 50 mol %, preferably from about 0.1 to about 20 mol %, more preferably from about 20 to about 30 mol %, more preferably from about 0.1 to about 10 mol %, more preferably from about 0.1 to about 5 mol %, and more preferably still from about 0.2 to about 1.5 mol %. The dopants can be a ceramic having metal ions selected from the group consisting of one or more of transition metals, noble metals, Group IA metals, Group IIA metals, Group IIIB, metals lanthanides, actinides, or a combination thereof. The dopants can be anions such as halides. For example, the addition of BaCl$_2$ to any material of the invention results in a chloride-doped material. The dopants are metal oxides that can be selected from the group consisting of transition metal, Group IA, Group IIA, Group IIIB, lanthanide and actinide metal oxides. Preferably the dopants can be selected from the group consisting of Eu oxide, Gd oxide and a combination thereof.

In all of the above and other embodiments, any or all of preferred catalytic materials, dopants, dopant levels, or the like can be used in combination with any others of these parameters.

Another aspect of the invention provides a method for synthesizing a composition having a high surface area, the composition preferably being a ceramic comprising an agglomerate of nanocrystallites. It is an advantage of the invention to provide a variety of methods for producing these materials, resulting in a synthetic flexibility. For example, because these materials can be used as catalysts, the synthetic flexibility provided by the invention allows for ease of variation of the numerous compositional parameters to maximize the eventual catalytic activity of these materials. Methods of the invention to synthesize ceramics include chemical precipitation, sol-gel processing of alkoxide precursors and inert gas condensation of pure metals. Preferably, the ceramic is a nanocrystalline Group IIIB oxide having surface areas as noted above. The preferred oxides of the present invention, $Sc_2O_3$, $Y_2O_3$, $La_2O_3$, $Gd_2O_3$, $Eu_2O_3$, $Dy_2O_3$, $Sm_2O_3$, $Lu_2O_3$, and combinations thereof, can be synthesized using all three of the above-mentioned synthetic techniques.

One embodiment provides a method for precipitating a ceramic from a solvent as a ceramic precipitate. The solvent is removed and the ceramic precipitate is recovered. The ceramic can be precipitated by adding a metal salt solution to a basic solution where the metal salt has a metal selected from the group consisting of a Sc, Y, La, Gd, Eu, Dy, Sm and a Lu salt. Preferably the metal salt is selected from the group consisting of Sc, Y, La, Gd, Eu, Dy, Sm and Lu nitrate. The metal salt can be in a concentration of from about 0.1 to about 0.5 M. The chemical precipitation can be performed with a water-soluble base, and preferably an organic base having a general formula $R_4N^+OH^-$. R can be a hydrocarbon such as a linear, branched, cyclic, or other hydrocarbon capable of forming $R_4N^+$. A non-limiting list of examples of R includes methyl, ethyl, butyl, isopropyl, and the like. The base can be in a concentration of from about 2 to about 32 weight percent. The solvent can have a pH of from about 5 to about 14, preferably from about 7 to about 10. The ceramic can be precipitated from the solvent at a temperature of from about 5° C. to about 50° C. The chemical precipitation method can be followed by washing with a suitable solvent such as an alcohol and supercritical drying (involving displacing alcohol and/or other fluids with a supercritical fluid and venting the supercritical fluid above supercritical temperature). The solvent can also be removed from the precipitated ceramic by adding water to a solution of metal alkoxide. The metal alkoxide can be selected from the group consisting of Sc, Y, La, Gd, Eu, Dy, Sm and Lu alkoxide, and preferably selected from the group consisting of Sc, Y, La, Gd, Eu, Dy, Sm and Lu isopropoxide.

In another embodiment, the method involves sol-gel processing of an oxide. Sol-gel processing can be used to prepare oxides and doped oxides selected from the group consisting of transition metals, noble metals, Group IA, Group IIA, Group IIIB oxides, lanthanide oxides, actinide oxides, and any combination thereof.

Another embodiment provides a method comprising synthesizing a ceramic through post-oxidation of a metal produced through inert gas condensation. An inert gas condensation process can involve a doped oxide selected from the group consisting of one or more of transition metals, noble metals, Group IA, Group IIA, Group IIIB oxides, lanthanide oxides, actinide oxides, or any combination of these. The metal can be selected from the group consisting of Sc, Y, La, Gd, Eu, Dy, Sm and Lu. In another embodiment, oxidation of the metal occurs during condensation.

Another aspect of the invention provides a method for calcining nanocrystalline ceramic. The ceramic which comprises crystallites is calcined at a temperature of 800° C. and preferably at a temperature of about 1000° C. The recovered crystallites preferably have a surface area of at least about 10 $m^2/g$ and a crystallite size of less than about 100 nm, more preferably having a surface area of at least about 25 $m^2/g$ and a crystallite size of less than about 50 nm, more preferably having a surface area of at least about 50 $m^2/g$ and a crystallite size of less than about 20 nm, and more preferably still having a surface area of at least about 100 $m^2/g$ and a crystallite size of less than about 10 nm. In another set of preferred embodiments, the recovered ceramic crystallites have a theoretical density of at least about 90%, preferably at least about 95% and more preferably at least about 98% at any of the above-mentioned calcining temperature conditions.

Another embodiment provides a method to perform X-ray scintillation with a sintered nanocrystalline ceramic having an average particle size of less than about 1 $\mu$m, preferably about 0.5 $\mu$m and more preferably about 0.2 $\mu$m. The ceramic can be selected from the group consisting of $Sc_2O_3$, $Y_2O_3$, $La_2O_3$, $Gd_2O_3$, $Eu_2O_3$, $Dy_2O_3$, $Sm_2O_3$, $Lu_2O_3$, and doped $Sc_2O_3$, $Y_2O_3$, $La_2O_3$, $Gd_2O_3$, $Eu_2O_3$, $Dy_2O_3$, $Sm_2O_3$, and $Lu_2O_3$. A preferred ceramic is $Y_2O_3$ doped with Eu and/or Gd in an amount of from about 0.1 to about 50 mol %. In a preferred embodiment, the dopant is present in one of the above-mentioned preferred ranges or, in another embodiment, is present in an amount from about 20 to about 30 mol %. The ceramic has a theoretical density of at least about 90%, preferably at least about 95%, and more preferably at least about 98%.

Another aspect provides a method to use these high surface area materials of the invention as catalysts. A high surface area exposes many active sites and hence allows high conversions to be obtained. The materials used as catalysts are preferably ceramic materials which can be any of the described preferred ceramic materials including dopant in any of the described ranges. The ceramic materials can be non-zeolitic catalysts, and in a preferred embodiment the ceramic catalyst can be selected from the group consisting of $Sc_2O_3$, $Y_2O_3$, $La_2O_3$, $Gd_2O_3$, $Eu_2O_3$, $Dy_2O_3$, $Sm_2O_3$, and $Lu_2O_3$, and doped $Sc_1O_3$, $Y_2O_3$, $La_2O_3$, $Gd_2O_3$, $Eu_2O_3$, $Dy_2O_3$, $Sm_2O_3$, and $Lu_2O_3$. The catalyst can be a group IIIB metal oxide such as $Sc_2O_3$, $Y_2O_3$ and $La_2O_3$. It is a feature of the group IIIB metal oxides to provide high surface areas because the high surface areas can influence catalytic activity. Preferably the catalyst is a non-zeolitic ceramic catalyst having a surface area of at least 10 $m^2/g$ or any of the above-mentioned surface areas.

Preferably these materials can be used to catalyze the reduction of nitrogen oxide ($NO_x$) compounds. "$NO_x$ reduction" is defined as a reaction that results in a decrease in a formal oxidation state of nitrogen in the $NO_x$ compound. For example, $NO_x$ which has nitrogen in a formal oxidation state of +2, can be reduced to $N_2$ which has a neutrally charged nitrogen. The materials of the invention can catalyze the reduction of $NO_x$ compounds selected from the group consisting of $NO_2$, NO and $N_2O$. For example the preferred catalysts can reduce $NO_2$ to NO, reduce $NO_2$ and NO to $N_2O$ and reduce $NO_2$, NO and $N_2O$ to $N_2$. Because $N_2$ is by far the least toxic of the above-mentioned nitrogen-containing compounds, a preferred method of the invention involves the use of these compounds to reduce $NO_x$ compounds to $N_2$.

In one embodiment, the $NO_x$ reduction reaction can involve catalytic decomposition of $NO_x$ in the absence of a reducing agent. In this embodiment, the catalyst of the invention can function to provide a surface having a plurality of sites which allow the $NO_x$ compounds to attach to the surface. Upon attachment, the $NO_x$ compound may undergo at least a partial reduction. It is a feature of the invention to directly transform harmful $NO_x$ emissions into nontoxic substances. An $NO_x$ reduction that occurs in the absence of an external reductant results in the release of $N_2$ and $O_2$. In another embodiment the catalyst can cause $NO_x$ reduction in the presence of $O_2$.

In another embodiment, the catalytic $NO_x$ reduction reaction is performed by any of the above-described materials in the presence of an external reducing agent, preferably a nontoxic reducing agent, more preferably a hydrocarbon and more preferably $CH_4$. Non-zeolitic metal oxide catalysts can be used for selective catalytic reduction of $NO_x$ by $CH_4$. In one set of embodiments, group IIIB metal oxides ($Sc_2O_3$, $Y_2O_3$ and $La_2O_3$) can be used in conjunction with $CH_4$ to provide catalysts that exhibit very high activity for $NO_x$ reduction. In these embodiments, the non-zeolitic materials can function to transform $CH_4$ to an activated species which in turn aids in the reduction of $NO_x$. In another embodiment, it is the activated species that actually catalyzes the $NO_x$ reduction. The end products of the catalysis are nontoxic compounds such as $CO_2$, $H_2O$ and $N_2$.

Dioxygen, $O_2$, may also play a role in the catalytic process, a source of $O_2$ being the $NO_x$ reactant or excess $O_2$ in the atmosphere. For industrial purposes, it is useful to design a catalyst that catalyzes $NO_x$ reduction in the presence of $O_2$ because $O_2$ is typically present in exhaust gases. Some materials, however, may show a decrease in catalytic activity in the presence of excess $O_2$ due to a reaction between $O_2$ and the activated species formed from $CH_4$ and the catalyst. It is an advantage of the present invention that $NO_x$ reduction can occur in the presence of stoichiometric $O_2$ and more preferably in the presence of excess $O_2$ while maintaining high catalytic activity. Thus, in a preferred embodiment, the materials of the invention selectively catalyze the reduction of $NO_x$ compounds. "Selective catalysis" is defined as a selective reaction of the activated species with NO even in the presence of excess $O_2$. In this embodiment, because the activated species shows selectivity for NO over $O_2$, catalytic activity is not substantially lost in the presence of excess $O_2$. Catalytic activity is monitored by the conversion of $NO_x$ compounds to $N_2$. In this and in any of the preferred embodiments, whether the $NO_x$ reduction with $CH_4$ occurs in the presence or absence of excess $O_2$, the end products are nontoxic products such as $CO_2$, $H_2O$ and $N_2$.

In another embodiment the catalyst and an external reducing agent can cause $NO_x$ reduction in the presence water vapor and more preferably in the presence of water vapor and $O_2$. It is a feature of the catalyst of the present invention that even if the catalytic activity decreases somewhat in the presence of water vapor, removal of the water vapor results in a return to the original catalytic activity values.

Other embodiments of the method to reduce $NO_x$ compounds involves a combination of preferred parameters. In one embodiment, the method comprises providing a ceramic having a surface area of at least 10 $m^2/g$ and allowing $NO_x$ reduction to occur.

One embodiment of the invention provides a method for reducing $NO_x$ compounds, the method comprising adsorbing $NO_x$ onto a surface of the catalyst where the catalyst is a ceramic. The ceramic has a surface area of at least about 10 $m^2/g$. $CH_4$ activation occurs at the surface at a temperature of less than about 700° C. Preferably, the temperature is less than about 600° C., more preferably less than about 500° C. and more preferably still less than about 400° C.

Another embodiment provides a method comprising exposing a ceramic catalyst to temperatures in excess of 1000° C. The catalyst is then exposed to $NO_2$, NO or $N_2O$ where the ceramic catalyst has a surface area of at least 10 $m^2/g$ and $NO_x$ reduction is allowed to occur.

Another embodiment provides a method comprising exposing a ceramic catalyst to $NO_x$, the ceramic catalyst having a surface area of at least about 10 $m^2/g$, and allowing $NO_x$ to undergo a reduction reaction at an elevated rate defined as a rate scaled, for particular reaction conditions, relative to a rate involved in exposing about 100 mg of ceramic catalyst to about 100 ml/min of about 4000 ppm NO, 4000 ppm $CH_4$ and 4% $O_2$ and allowing the $NO_x$ reduction to occur at a rate of at least about $2\times10^{-7}$ mol $N_2/g$ sec at 700° C., more preferably the reduction rate is at least about $9\times10^{-8}$ mol $N_2/g$ sec at 600° C., and more preferably the reduction rate is at least about $3\times10^{-8}$ mol $N_2/g$ sec at 500° C.

In another embodiment, at least 90% of the initial catalytic conversion is sustained for at least 2 h.

A simple screening technique to determine ceramic, non-zeolitic catalysts suitable for use in accordance with this embodiment of the invention is to provide readily-obtainable candidate material (such as low-surface area, commercially-available material) and to simply expose the material to conditions under which catalytic reduction of $NO_x$ can occur, and to determine the occurrence of such reduction, even at low levels due to the low surface area of the catalyst. Ceramic/dopant combinations can readily be tested by mixing commercially-available ceramic with dopant, crudely combining them (via, for example, crushing in a mortar and pestle) and subjecting the material to reaction conditions.

In all aspects of the invention, the ceramic material can be any of the described preferred ceramic materials including dopant in any of the described ranges. The methods of making compounds can be used, and preferably are used, in combination with the compositions of matter described herein, and catalytic processes described herein can be used with any suitable materials described herein, with the catalytic materials preferably being made according to one of the preferred methods of making material, as described.

The function and advantage of these and other embodiments of the present invention will be more fully understood from the examples below. The following examples are intended to illustrate the benefits of the present invention, but do not exemplify the full scope of the invention.

EXAMPLE 1
Chemical Precipitation of Yttrium Oxide

A series of experiments were conducted to determine the optimal precursor concentration, pH, aging time, aging temperature, drying method and heat treatment for the synthesis of yttrium oxide, where the optimal yttrium oxide is the one that possesses the highest surface area. The general procedure for the synthesis of yttrium oxide was the addition of an aqueous solution (0.10–0.50 M) of $Y(NO_3)_3 \cdot xH_2O$ (99.9% Alfa Aesar) to a stirred aqueous solution of the precipitating agent ($NH_4OH$—Malinkrodt, $(C_2H_5)_4NOH$—Alfa Aesar, $(C_4H_9)_4NOH$—Alfa Aesar) at a rate of 10 ml/min. Addition of the nitrate solution was terminated when the target pH (7.8–14.3) was attained. The precipitated gel was then stirred with a magnetic stirrer at the desired aging temperature (5–50° C.) for the desired aging time (0–46 h). Following the aging step, the material was washed to remove ions and dried. The four washing and drying techniques examined were: successive ethanol washes followed by filtration (designated Dry Ground), successive ethanol washes followed by filtration and grinding in a warm mortar and pestle to remove the alcohol (Wet Ground), an acetone wash followed by a toluene wash followed by an acetone wash and filtration (ATA), and successive ethanol washes followed by supercritical drying at 300° C. and 240 bar $N_2$ (SCD). The precipitate was then further dried overnight at room temperature, ground, oven-dried at 120° C. for 12 hours and ground once more. The dried materials were calcined in flowing oxygen at 600° C. with a heating rate of 2.5° C./min and a soak time of 3 hours.

The evolution of yttrium oxide from the precipitate was examined by monitoring weight loss as a function of temperature with a Perkin Elmer TGA7 Thermogravimetric Analyzer and by using photoacoustic Fourier-transform infrared spectroscopy (PA-FTIR) on a BioRad FTS 60A Digilab spectrometer. Phase identification and crystallite size analysis was performed by X-ray powder diffraction (XRD) using a Siemens D5000 diffractometer (45 kV–40 mA, Cu-Kα). The crystallite size was calculated using Scherrer's analysis of the line broadening of the (222) peak, corrected for instrumental line broadening. The BET surface area of the yttrium oxide precipitates was evaluated with nitrogen adsorption analysis on a Micromeritics ASAP2000.

EXAMPLE 2
Effect of Calcination Temperature on Composition

The material directly precipitated from this synthesis route was an amorphous yttrium nitrate hydroxide with a chemical formula of approximately $Y(OH)2.5(NO_3)_{0.5}$. Calcination of the precipitate was necessary to convert the precipitate to pure nanocrystalline yttrium oxide. Trial 1, whose synthesis conditions are given in Table 1, was examined to determine weight loss, surface species present, and the crystal phases present as a function of temperature.

TABLE 1

| | | Synthesis Conditions for Trial 1 | | | | |
|---|---|---|---|---|---|---|
| Trial | Base | Precursor Concentration (M) | pH | Aging Temperature (° C.) | Aging Time (h) | Drying Technique |
| 1 | $(C_2H_5)_4NOH$ | 0.25 | 10.0 | 25 | 23 | ATA |

Figure 2:
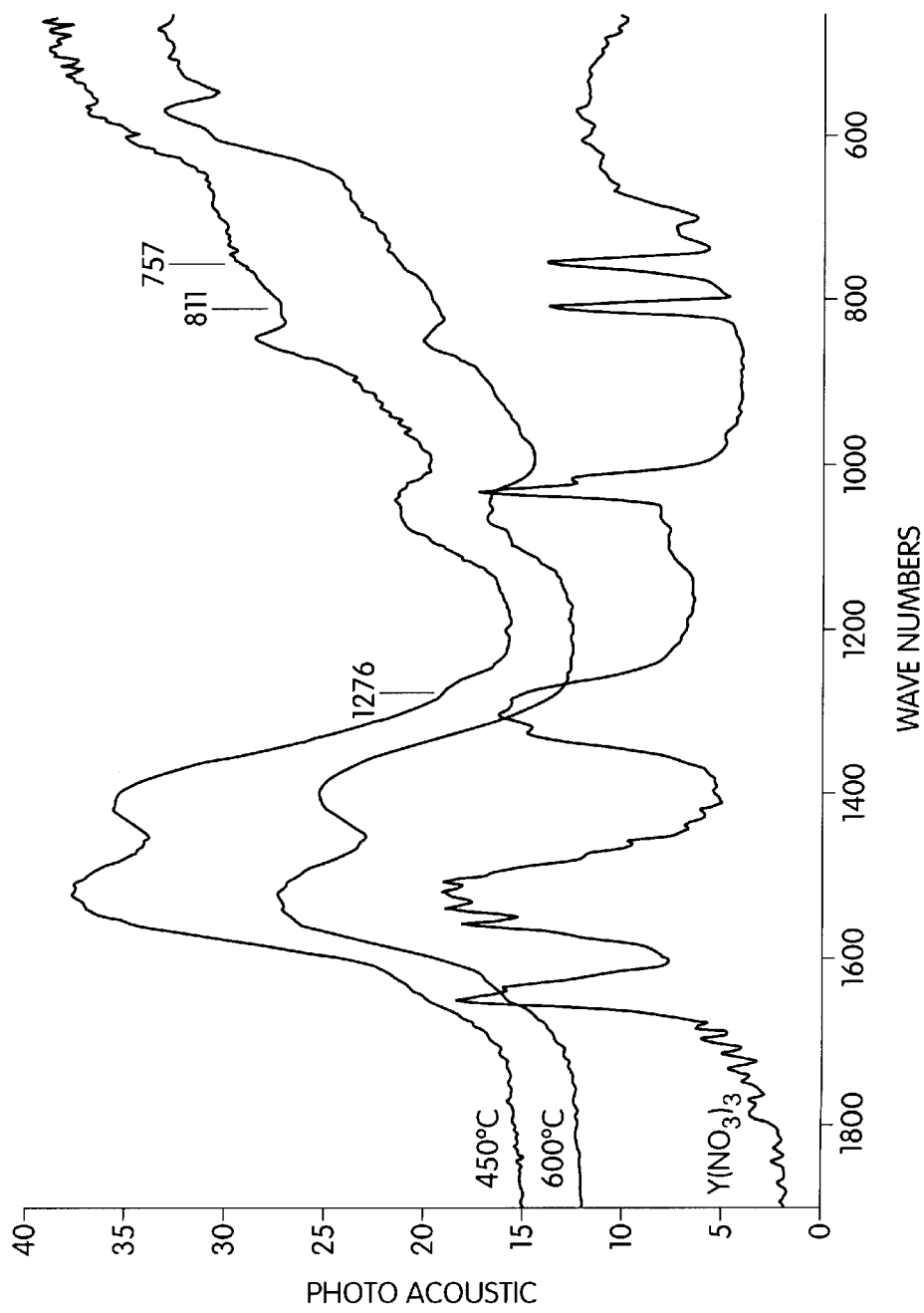
FIG. 2 shows infrared spectra of yttrium precipitates.

FIG. 1 presents weight loss as a function of temperature for Trial 1 in an oxygen atmosphere. Above 600° C. no weight loss occurs. PA-FTIR spectra for a Trial 1 calcined at different temperatures, and $Y(NO_3)_3 \cdot xH_2O$ (Alfa Aesar, 99.9%) are presented in FIG. 2. The spectrum for $Y(NO_3)_3 \cdot xH_2O$ shows many peaks characteristic of unidentate and bidentate nitrate species (unidentate $NO_2$ asymmetric stretch—1539 $cm^{-1}$, unidentate $NO_2$ symmetric stretch—1276 $cm^{-1}$, unidentate N=O stretch—1034 $cm^{-1}$, bidentate $NO_2$ symmetric stretch—1042 $cm^{-1}$, unidentate out of plane—811 $cm^{-1}$, unidentate and bidentate $NO_2$ symmetric bend—757 $cm^{-1}$). The unidentate peaks at 1276, 811 and 757 $cm^{-1}$ are of particular interest, as they are still present in the precipitate calcined at 450° C., but have been eliminated by 600° C.

Figure 3:
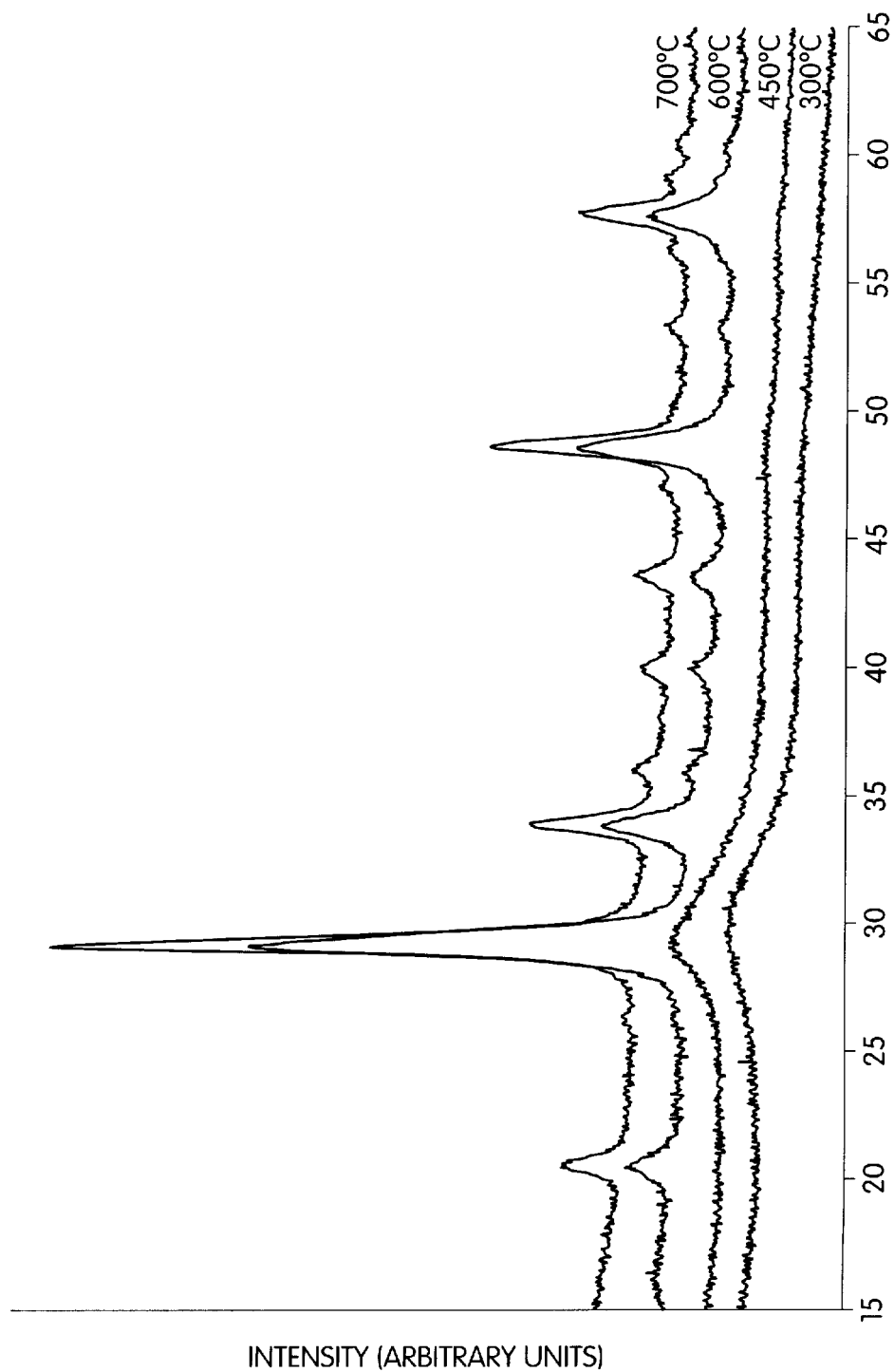
FIG. 3 shows XRD patterns of calcined yttrium precipitates.

XRD patterns of the precipitate after calcination at 300, 450, 600 and 700° C. are shown in FIG. 3. Trial 1 calcined at 300° C. and 450° C. is amorphous, while samples calcined at 600° C. and 700° C. exhibit peaks characteristic of the cubic phase (space group Ia3) of yttrium oxide (JCPDS card 41-1105). A calcination temperature of 600° C. was chosen as the optimum for further work, since it was the preferred minimum temperature at which a pure yttrium oxide powder was produced. All subsequent precipitates that were calcined at 600° C. or above exhibited this single phase of yttrium oxide.

EXAMPLE 3
Effect of Precursor Concentration

The concentration of the nitrate solution added to the precipitating agent can affect the nucleation rate and growth rate of crystallites. The synthesis conditions of yttria gels used to determine the effect of precursor concentration are presented in Table 2.

TABLE 2

Effect of Precursor Concentration: Synthesis Conditions

| Trial | Base | Precursor Concentration (M) | pH | Aging Temperature (° C.) | Aging Time (h) | Drying Technique |
|---|---|---|---|---|---|---|
| 2 | $(C_2H_5)_4NOH$ | 0.10 | 10.0 | 25 | 22 | ATA |
| 1 | $(C_2H_5)_4NOH$ | 0.25 | 10.0 | 25 | 23 | ATA |
| 3 | $(C_2H_5)_4NOH$ | 0.50 | 10.0 | 25 | 22 | ATA |

TABLE 3

Effect of Precursor Concentration: Results

| Trial | Surface Area (m²/g) | Crystallite Size (nm) |
|---|---|---|
| 2 | 102 | 9.6 |
| 1 | 112 | 9.0 |
| 3 | 100 | 10.2 |

A precursor concentration of 0.25 M produced a calcined powder with the highest surface area and smallest crystallite size of the three precursor concentrations examined. Increasing or decreasing the precursor concentration from 0.25 M produced a material with a lower surface area and slightly larger crystallites. The 0.25 M yttrium nitrate solution was chosen as the optimal precursor solution, and subsequent trials employed this concentration.

EXAMPLE 4
Effect of Aging Time

The structural development of precipitates can be controlled by varying the aging time of the gel. By increasing aging time, the precipitates have a chance to undergo dissolution and recrystallization, which is expected to reduce surface area and enlarge the crystallite size. The synthesis conditions of yttria gels used to determine the effect of aging time are presented in Table 4.

TABLE 4

Effect of Aging Time: Synthesis Conditions

| Trial | Base | Precursor Concentration (M) | pH | Aging Temperature (° C.) | Aging Time (h) | Drying Technique |
|---|---|---|---|---|---|---|
| 4 | $(C_2H_5)_4NOH$ | 0.25 | 10.0 | 25 | 0.2 | ATA |
| 1 | $(C_2H_5)_4NOH$ | 0.25 | 10.0 | 25 | 23 | ATA |
| 5 | $(C_2H_5)_4NOH$ | 0.25 | 10.0 | 25 | 46 | ATA |

TABLE 5

Effect of Aging Time: Results

| Trial | Surface Area (m²/g) | Crystallite Size (nm) |
|---|---|---|
| 4 | 113 | 9.6 |
| 1 | 112 | 9.0 |
| 5 | 101 | 9.9 |

As expected, the surface area of the yttrium oxide powder decreased with aging time, with minor changes in crystallite size. Since little decrease in surface area was observed for the first 24 h of aging, an aging time of 0–24 h is preferred for the synthesis of yttrium oxide.

EXAMPLE 5
Effect of Final pH

The final pH of the solution plays a large role in determining the final surface area of a precipitate, since the pH has an effect on the surface charge of the particles, which in turn affects the agglomeration of the precipitate. The synthesis conditions of yttria gels used to determine the effect of final solution pH are presented in Table 6.

TABLE 6

Effect of Final Solution pH: Synthesis Conditions

| Trial | Base | Precursor Concentration (M) | pH | Aging Temperature (°C.) | Aging Time (h) | Drying Technique |
|---|---|---|---|---|---|---|
| 6 | $(C_2H_5)_4NOH$ | 0.25 | 7.8 | 25 | 21 | ATA |
| 1 | $(C_2H_5)_4NOH$ | 0.25 | 10.0 | 25 | 23 | ATA |
| 7 | $(C_2H_5)_4NOH$ | 0.25 | 11.8 | 25 | 21 | ATA |
| 8 | $(C_2H_5)_4NOH$ | 0.25 | 14.3 | 25 | 0.2 | ATA |

TABLE 7

Effect of Final Solution pH: Results

| Trial | Surface Area ($m^2/g$) | Crystallite Size (nm) |
|---|---|---|
| 6 | 102 | 9.6 |
| 1 | 112 | 9.0 |
| 7 | 102 | 9.7 |
| 8 | 81.2 | 10.9 |

All of the aging times in this set of trials lie between 0 and 23 hours, and hence are not expected to affect the surface area of the precipitates. Varying the pH from 7.8 to 14.3 had no significant effect on crystallite size, but did have a large effect on the surface area of the materials. The surface area goes through a maximum near a pH of ten, and hence this was chosen as the optimal pH for yttria synthesis.

EXAMPLE 6
Effect of Precipitation and Aging Temperature

Precipitation and aging temperature affects the precipitate in two ways. First, the temperature alters the solubility of the product. Thus for a given set of synthesis conditions, lowering the temperature is expected to increase supersaturation. The temperature also affects the kinetics of the crystal nucleation and growth processes. The synthesis conditions of yttria gels used to determine the effect of precipitation and aging temperature are presented in Table 8.

TABLE 8

Effect of Precipitation and Aging Temperature: Synthesis Conditions

| Trial | Base | Precursor Concentration (M) | pH | Temperature (°C.) | Aging Time (h) | Drying Technique |
|---|---|---|---|---|---|---|
| 9 | $(C_2H_5)_4NOH$ | 0.25 | 8.9 | 5 | 0.2 | ATA |
| 1 | $(C_2H_5)_4NOH$ | 0.25 | 10.0 | 25 | 23 | ATA |
| 10 | $(C_2H_5)_4NOH$ | 0.25 | 10.1 | 50 | 16 | ATA |

TABLE 9

Effect of Precipitation and Aging Temperature: Results

| Trial | Surface Area ($m^2/g$) | Crystallite Size (nm) |
|---|---|---|
| 9 | 86.1 | 10.4 |
| 1 | 112 | 9.0 |
| 10 | 113 | 9.3 |

Although the pH and aging time for the trial precipitated at 5° C. were lower than the other trials, it has been shown that such values for these two parameters should not affect the final surface area by more than 10 $m^2/g$. Thus, the reduction in surface area of 26 $m^2/g$ for the low temperature precipitate is partially due to the lower temperature. Since room temperature processing yields high surface areas, 25° C. is the preferred precipitation and aging temperature for yttrium oxide synthesis.

EXAMPLE 7
Effect of Washing and Drying Method

In general, the dewatering and drying of precipitates has the largest effect on powder surface area. Reprecipitation of dissolved salts can occur when the residual solvent evaporates, increasing the agglomeration of the material. Additionally, surface tension at the liquid-vapor interface can induce pore collapse during the drying process, resulting in a dense, non-porous material. Each of the four washing and drying techniques examined in this study reduces these detrimental effects in some way. Dry grinding and the acetone-toluene-acetone wash method reduce the redeposition of dissolved salts, while wet grinding and supercritical drying minimize the effects of both phenomena. The synthesis conditions of yttria gels used to determine the effect of the washing and drying method are presented in Table 10.

TABLE 10

Effect of Washing and Drying Method: Synthesis Conditions

| Trial | Base | Precursor Concentration (M) | pH | Aging Temperature (° C.) | Aging Time (h) | Washing Solvent | Drying Technique |
|---|---|---|---|---|---|---|---|
| 11 | $(C_2H_5)_4NOH$ | 0.25 | 10.0 | 25 | 11 | $C_2H_5OH$ | Wet Ground |
| 12 | $(C_2H_5)_4NOH$ | 0.25 | 10.0 | 25 | 11 | $C_2H_5OH$ | Dry Ground |
| 1 | $(C_2H_5)_4NOH$ | 0.25 | 10.0 | 25 | 23 | ATA | Dry Ground |
| 13 | $(C_2H_5)_4NOH$ | 0.25 | 10.0 | 25 | 11 | $C_2H_5OH$ | SCD |

TABLE 11

Effect of Washing and Drying Method: Results

| Trial | Surface Area (m$^2$/g) | Crystallite Size (nm) |
|---|---|---|
| 11 | 96.6 | 10.9 |
| 12 | 118 | 8.8 |
| 1 | 112 | 9.0 |
| 13 | 129 | 12.8 |

The preferred method for producing high surface area yttrium oxide precipitates was ethanol washes followed by supercritical drying at 300° C. and 240 bar. This process caused the liquid-vapor interface to be eliminated during drying and allowed the pore structure of the material to largely remain intact as the solvent was removed. However, crystallite growth occurred during this process. The higher temperature involved in the SCD process allowed more of the precipitate to dissolve in the solvent, and then redeposit when the liquid was removed. Since high surface area was deemed to be more important to the catalytic activity than crystallite size, supercritical drying is the preferred method of solvent removal.

EXAMPLE 8
Effect of Base Concentration (Ionic Strength)

The ionic strength of a solution alters the double layer potential surrounding a precipitated particle, and hence affects the degree of agglomeration and the surface area. The concentration of the base solution to which the nitrate solution is added has a large effect on the ionic strength of the final precipitate mixture. The synthesis conditions of yttria gels used to determine the effect of the concentration of the base are presented in Table 12.

TABLE 12

Effect of Base Concentration: Synthesis Conditions

| Trial | Base Concentration | Precursor Concentration (M) | pH | Aging Temperature (° C.) | Aging Time (h) | Drying Technique |
|---|---|---|---|---|---|---|
| 14 | 2 wt % $(C_2H_5)_4NOH$ | 0.25 | 9.9 | 25 | 18 | ATA |
| 1 | 8 wt % $(C_2H_5)_4NOH$ | 0.25 | 10.0 | 25 | 23 | ATA |
| 15 | 32 wt % $(C_2H_5)_4NOH$ | 0.25 | 10.1 | 25 | 19 | ATA |

TABLE 13

Effect of Base Concentration: Results

| Trial | Estimated Ionic Strength (mol/L) | Surface Area (m$^2$/g) | Crystallite Size (nm) |
|---|---|---|---|
| 14 | 0.12 | 100 | 10.0 |
| 1 | 0.32 | 112 | 9.0 |
| 15 | 0.45 | 109 | 9.4 |

For precipitations involving tetraethylammonium hydroxide, the ionic strength had a small effect on the final precipitate characteristics.

EXAMPLE 9

Effect of Precipitating Base

The type of base used to precipitate the nitrate solution is another factor in determining the final product quality. Organic bases are preferred for this application, since a mild calcination following drying will remove all remnants of the base from the material. In these studies, an 8 wt % solution of base in water was used as the precipitating agent. The synthesis conditions of yttria gels used to determine the effect of the base are presented in Table 14.

TABLE 14

Effect of Precipitating Agent: Synthesis Conditions

| Trial | Base | Precursor Concentration (M) | pH | Aging Temperature (° C.) | Aging Time (h) | Drying Technique |
|---|---|---|---|---|---|---|
| 16 | $NH_4OH$ | 0.25 | 10.0 | 25 | 19 | ATA |
| 1 | $(C_2H_5)_4NOH$ | 0.25 | 10.0 | 25 | 23 | ATA |
| 17 | $(C_4H_9)_4NOH$ | 0.25 | 10.0 | 25 | 21 | ATA |

TABLE 15

Effect of Precipitating Agent: Results

| Trial | Surface Area (m²/g) | Crystallite Size (nm) |
|---|---|---|
| 16 | 76.8 | 11.9 |
| 1 | 112 | 9.0 |
| 17 | 121 | 8.7 |

TABLE 16

Use of Alkoxide Precursors: Results

| Trial | Precursor | Surface Area (m²/g) | Crystallite Size (nm) |
|---|---|---|---|
| 10a | $Y(OCH(CH_3)_2)_3$ | 112 | 9.3 |
| 10b | $Y_5O(OCH(CH_3)_2)_{13}$ | 109 | 10.2 |

Although these precipitations were performed at very different ionic strengths, differences in surface area and crystallite size that can be attributed to the type of base were observed. An additional trial was performed with a more dilute solution of $NH_4OH$ (0.56 M) that was estimated to produce the same ionic strength as Trial 1, but the surface area and crystallite size were essentially the same as Trial 16 (81.7 m²/g, 10.7 nm). While not wishing to be bound by any theory, it can be concluded that tetrabutylammonium hydroxide produces yttrium oxide samples with the largest surface area and smallest crystallite size.

EXAMPLE 10

Sol-Gel Processing Using Yttrium Alkoxide Precursors

Yttrium alkoxide precursors can also be used to produce high surface area, nanocrystalline yttrium oxide catalysts. The hydrolysis and condensation of yttrium isopropoxide $(Y(OCH(CH_3)_2)_3$, Alfa Aesar, 92–95%) and yttrium oxide isopropoxide $(Y_5O(OCH(CH_3)_2)_{13}$, Strem, 99.9%) were examined.

The general procedure for the synthesis of oxides from these alkoxide precursors involves the hydrolysis of a solution of alkoxide in benzene with a solution of water in alcohol. The benzene solution contained 0.05 M (metals basis) yttrium alkoxide and the alcoholic solution consisted of 20% water and 80% ethanol. An amount of the alcoholic solution containing ten times the stoichiometric amount of water needed to fully hydrolyze the alkoxide was slowly added to the alkoxide solution. The resulting gelatinous solution was then aged for 1 hour and repeatedly washed with ethanol. The precipitate was then supercritically dried at 300° C. and 240 bar. After allowing the powder to oven dry at 120° C. for 12 h, the powder was calcined in oxygen to 600° C. with a ramp rate of 2.5° C./min and a soak time of 3 hours. Characteristics of the resulting yttrium oxide powders are presented in Table 16.

EXAMPLE 11

Inert Gas Condensation of Yttrium

Fine grained yttrium oxide was also produce by the oxidation of fine clusters of yttrium metal. These clusters were produced by thermal evaporation of yttrium metal followed by inert gas condensation of the supersaturated vapor to form nanometer-sized clusters.

Yttrium metal chips (Alfa Aesar, 99.9%) were placed in a tungsten crucible mounted in an ultra high vacuum (UHV) system designed for production of nanocrystalline materials. A potential of 1.1 to 1.8 V (300–600 A) was applied across the crucible to volatilize the yttrium metal. The metal evaporated into an atmosphere of 0.75 to 6.5 mbar of helium, where condensation and coalescence occurred. The metal clusters were collected via thermophoresis on a liquid nitrogen cooled, rotating substrate. Oxidation of these particles was then performed on the cold substrate by introducing 0.5 to 2 mbar of oxygen to the system. The particles were kept in the oxygen atmosphere overnight, by which time the substrate had warmed to room temperature, and the particles were nearly fully oxidized. The particles were further oxidized by calcination in oxygen at 600° C. with a soak time of 3 hours and a ramp rate of 2.5° C./min. Some synthesis parameters and results are presented in Table 17.

TABLE 17

Inert Gas Condensation: Synthesis Conditions and Results

| Trial | Helium Pressure (mbar) | Voltage (V) | Oxidation Pressure (mbar) | Surface Area (m²/g) | Crystallite Size (nm) |
|---|---|---|---|---|---|
| 18 | 3.0 | 1.3 | 1.0 | 55.6 | 24.4 |
| 19 | 1.5 | 1.3 | 1.0 | 89.2 | 11.9 |

EXAMPLE 12

Chemical Precipitation of Lanthanum Oxide

A set of synthesis conditions were used for lanthanum oxide that were similar to the optimal set for yttrium oxide synthesis. Because the surface charge of lanthanum oxide precipitates may be different than yttria precipitates, the final solution pH was varied to determine the ideal conditions for minimal particle agglomeration. The synthesis conditions of lanthana gels used to determine the effect of final solution pH are presented in Table 18.

TABLE 18

Effect of Final Solution pH: Synthesis Conditions

| Trial | Base | Precursor Concentration (M) | pH | Aging Temperature (° C.) | Aging Time (h) | Drying Technique |
|---|---|---|---|---|---|---|
| 20 | $(C_2H_5)_4NOH$ | 0.25 | 8.4 | 25 | 21 | ATA |
| 21 | $(C_2H_5)_4NOH$ | 0.25 | 9.9 | 25 | 23 | ATA |
| 22 | $(C_2H_5)_4NOH$ | 0.25 | 12.4 | 25 | 21 | ATA |

TABLE 19

Effect of Final Solution pH: Results

| Trial | Surface Area ($m^2/g$) | Crystallite Size (nm) |
|---|---|---|
| 20 | 38.7 | 22.7 |
| 21 | 37.6 | 23.2 |
| 22 | 30.8 | 27.1 |

The results presented in Table 19 are from powders calcined at 650° C. This temperature was required to fully decompose the amorphous lanthanum hydroxide precipitate into pure lanthanum oxide. The final pH of the solution had a significant impact on the final surface area and crystallite size of lanthanum oxide. Increasing the pH from 8.4 to 12.4 lowered the surface area of the calcined product by 25% and caused a 19% increase in the crystallite size. The preferred pH for lanthanum oxide synthesis is approximately 8.4.

EXAMPLE 13
Chemical Precipitation of Scandium Oxide

Scandium oxide was precipitated under conditions similar to those used for yttrium oxide and lanthanum oxide. The synthesis conditions for several scandia gels are presented in Table 20.

TABLE 20

Synthesis of Scandium Oxide: Conditions

| Trial | Base | Precursor Concentration (M) | pH | Aging Temperature (° C.) | Aging Time (h) | Drying Technique |
|---|---|---|---|---|---|---|
| 23 | $(C_2H_5)_4NOH$ | 0.25 | 5.3 | 25 | 16 | ATA |
| 24 | $(C_2H_5)_4NOH$ | 0.25 | 7.8 | 25 | 16 | ATA |
| 25 | $(C_2H_5)_4NOH$ | 0.25 | 13.0 | 25 | 21 | ATA |

TABLE 21

Synthesis of Scandium Oxide: Results

| Trial | Surface Area ($m^2/g$) | Crystallite Size (nm) |
|---|---|---|
| 23 | 87.2 | 16.8 |
| 24 | 106.2 | 15.9 |
| 25 | 96.4 | 17.5 |

Although the precipitate decomposed to $Sc_2O_3$ by 400° C., these materials were calcined to 650° C. in anticipation of the temperatures that would be used for catalytic studies. The scandium oxide sample with the largest surface area and smallest crystallite size precipitated at a pH of 7.8.

EXAMPLE 14
Catalytic Activity

The catalytic activities of the Group BIB metal oxides for SCR of NO with $CH_4$ were tested in a catalytic reactor that consisted of a ¼" O.D. quartz tube with a porous quartz frit to support the catalyst. The tube was mounted vertically through a Lindberg tube furnace equipped with an Omega temperature controller. High purity gases (He, 10.1% $O_2$—He, 2.19% NO—He and 1.99% $CH_4$—He) were metered into the top of the quartz reactor with MKS mass flow controllers and the reactor effluent was analyzed with a Perkin Elmer Autosystem GC equipped with a 10'×⅛" O.D. molecular sieve 5 A and a 12'×⅛" O.D. Porapak Q chromatographic column. This allowed oxygen, nitrogen, nitrous oxide, methane, carbon dioxide, carbon monoxide and hydrogen in the reactor effluent to be separated and quantified. Typically, 100 mg of material with a mesh size of 55 to 80 was loaded into the quartz tube, and 100 ml/min of gas consisting of 4000 ppm NO, 4000 ppm $CH_4$ and 4% $O_2$ was passed through the catalyst bed. This corresponded to a GHSV of 60,000 $h^{-1}$ for lanthanum oxide, 30,000–60,000 $h^{-1}$ for yttrium oxide and 30,000 $h^{-1}$ for scandium oxide.

Figure 4:
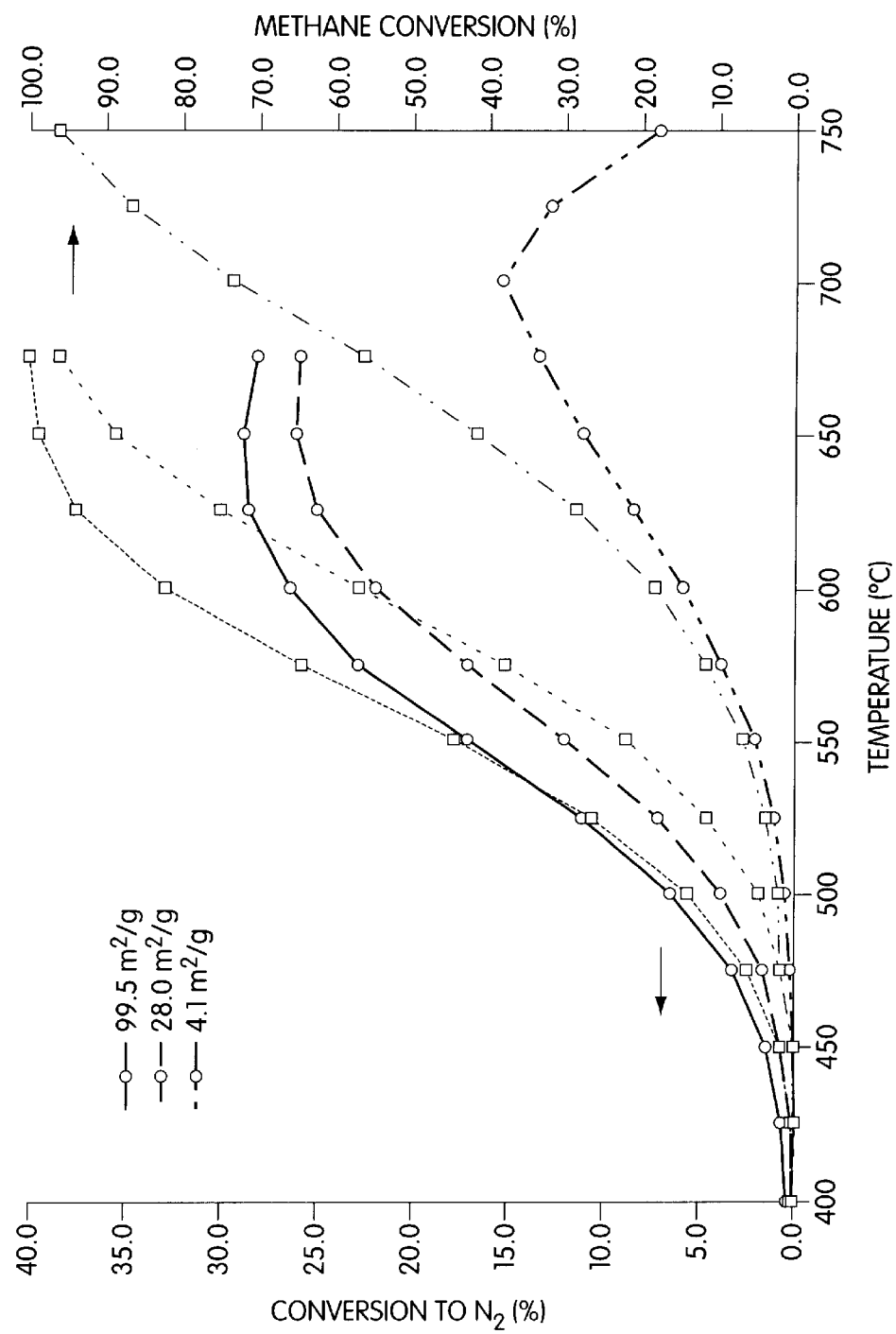
FIG. 4 shows the catalytic activity of Y$_2$O$_3$ samples with different surface areas.

The catalytic activity and selectivity to $N_2$ formation (moles of $N_2$ formed / moles of $CH_4$ consumed) for three samples of yttrium oxide with different surface areas are presented in FIG. 4. The catalytic activity measurements were made in decreasing temperature steps, to ensure that no thermal sintering occurred in the reactor

TABLE 22

Characteristics of Yttrium Oxide Catalytic Samples

| Sample | Surface Area ($m^2/g$) | Crystallite Size (nm) |
|---|---|---|
| 1 | 53.2 | 16.6 |
| 2 | 28.0 | 20.4 |
| 3 | 4.1 | >100 |

EXAMPLE 15

Effect of Metal Oxide

Figure 5:
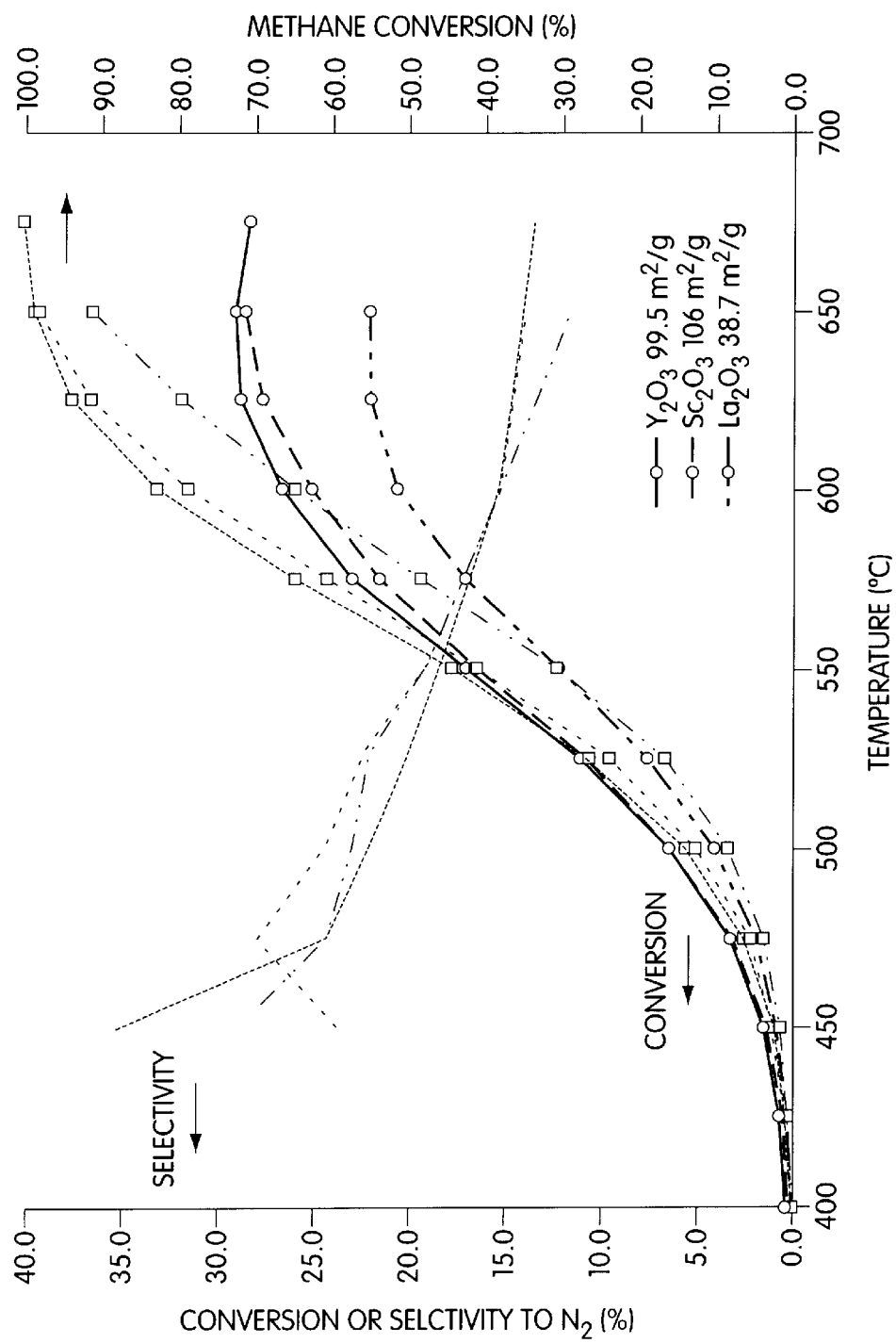
FIG. 5 shows the catalytic activity for different metal oxides.

The catalytic activity and selectivity for all three of the metal oxides synthesized are shown in FIG. 5. The properties of these samples are shown in Table 23. All three oxides show significant activity for the SCR reaction with the sample of yttrium oxide being the most active above 650° C. Yttrium oxide and scandium oxide exhibit comparable activities, while lanthanum oxide is less active due to its higher $CH_4$ light off temperature and lower $CH_4$ selectivity. For all three oxides, selectivity to $N_2$ formation decreases with temperature.

TABLE 23

Characteristics of Metal Oxide Catalytic Samples

| Metal Oxide | Surface Area ($m^2$/g) | Crystallite Size (nm) |
|---|---|---|
| $La_2O_3$ | 17.2 | 41.8 |
| $Y_2O_3$ | 53.2 | 16.6 |
| $Sc_2O_3$ | 83.6 | 21.1 |

EXAMPLE 16

Catalyst Stability

The catalytic activity of yttrium oxide was also measured in the presence of 2% water vapor to characterize the hydrothermal stability of the catalyst. At 650° C. a decrease in NO conversion from 32 to 29% was observed upon addition of water vapor to the reaction for 5 hours, however, upon removal of the water vapor, the initial catalytic activity was fully restored. Further, no loss of surface area from steaming of the catalyst was observed. The slight reduction of activity in the presence of $H_2O$ was due to an inhibition in the activation of $CH_4$, as the $CH_4$ conversion decreased while the $CH_4$ selectivity remained unchanged.

The thermal stability of this catalyst was also examined by calcining a yttrium oxide catalyst in-situ at 1000° C. for 2 hours. The catalytic activity of this sample decreased from 30% at 650° C. to 2% activity for NO reduction at 1000° C., but regained 19% activity upon cooling to 650° C. again.

EXAMPLE 17

Addition of Dopants

The addition of dopants to the simple metal oxide systems enhances the catalytic activity of these materials in several ways. First, the addition of lower valence elements (Group Ia, IIa) may enhance activity by generating oxygen vacancies. This has been shown to aid in the activation of methane over methane oxidative coupling catalysts, and may allow for lower temperature methane activation over these Group IIIB metal oxide catalysts for the SCR of $NO_x$ by $CH_4$. Since these catalysts exhibit higher selectivities to $N_2$ formation at lower temperatures, lowering the methane activation temperature may improve conversion to $N_2$. Similarly doping of the Group IIIB metal oxides with elements known for their oxidative ability (Pd, Rh, Pt, . . . ) may improve conversion in the SCR reaction. Finally, addition of transition metal elements should further improve the catalytic activity of the Group IIIB metal oxides, since these elements have the ability to improve both methane activation and NO adsorption on the surface.

EXAMPLE 18

Synthesis of Doped Yttria

The synthesis of doped Group IIIB metal oxides using any of the synthesis techniques that have been examined is a straightforward process. For sol-gel processing using alkoxide precursors, a mixture of the desired metal alkoxides in solution can be co-hydrolyzed to produce a very well dispersed binary or ternary oxide system. For inert gas condensation, mixtures of metals of the desired composition can be evaporated to produce clusters of the metals mixed at the atomic scale. Chemical co-precipitation of doped Group IIIB metal oxides with ammonium hydroxide is generally not feasible, since the ammonium ions complex with many transition metal, Group IA and Group IIA hydroxides, rendering them soluble in aqueous solutions. However, the use of tetraethylammonium hydroxide or tetrabutylammonium hydroxide as precipitating agents allows the co-precipitation technique to work, since the bulky ligands surrounding the nitrogen atom in the base reduce the degree of complexing, thus keeping the metal hydroxides insoluble in water. The dopants in metal oxides produced by this method will be very well dispersed, since the metals in the nitrate solution instantaneously precipitate when they are added to the highly basic precipitating solution.

A 1% Pd-doped $Y_2O_3$ sample was synthesized to demonstrate the procedure employed for adding dopants to a chemically precipitated yttrium oxide. 5.69 g $Y(NO_3)_3 \cdot xH_2O$ and 0.035 g $Pd(NO_3)_2$ were dissolved in 60 ml $H_2O$ to produce a 0.25 M (metals) solution. 40 ml of this solution was slowly added to 50 ml of 8 wt % tetraethylammonium hydroxide to a final pH of 10.0. After aging for 18 h the precipitate was ATA washed and air dried. Following oven drying and calcination in $O_2$ to 700° C. the surface area was 86.5 $m^2$/g and the $Y_2O_3$ crystallite size was 10.5 nm.

Those skilled in the art would readily appreciate that all parameters listed herein are meant to be exemplary and that actual parameters will depend upon the specific application for which the methods and apparatus of the present invention are used. It is, therefore, to be understood that the foregoing embodiments are presented by way of example only and that, within the scope of the appended claims and equivalents thereto, the invention may be practiced otherwise than as specifically described.

What is claimed is:

1. A method comprising:

exposing an $NO_x$ compound to a ceramic, the ceramic under conditions such that $NO_x$ reduction occurs, having a surface area of at least 10 $m^2$/g, the ceramic comprising an agglomerate of crystals having a mean crystallite size of less than 20 nm, the ceramic being selected from the group consisting of $Sc_2O_3$, $Y_2O_3$, $La_2O_3$, $Gd_2O_3$, $Eu_2O_3$, $Dy_2O_3$, $Sm_2O_3$, and $Lu_2O_3$, and doped $Sc_2O_3$, $Y_2O_3$, $La_2O_3$, $Gd_2O_3$, $Eu_2O_3$, $Dy_2O_3$, $Sm_2O_3$, and $Lu_2O_3$.

2. A method as in claim 1, wherein $NO_x$ reduction occurs at a temperature of less than about 700° C.

3. A method as in claim 1, further comprising adding $CH_4$ prior to exposing the $NO_x$ compound to the ceramic.

4. A method as in claim 1, wherein $NO_x$ reduction occurs in the presence of excess $O_2$.

5. A method as in claim 1, wherein $NO_x$ reduction occurs in the presence of methane, excess $O_2$ and water vapor.

6. A method as in claim 1, wherein the ceramic has a surface area of at least about 30 $m^2$/g.

7. A method as in claim 1, wherein the ceramic has a surface area of at least about 50 $m^2$/g.

8. A method as in claim 1, wherein the ceramic has a surface area of at least about 100 $m^2$/g.

9. A method as in claim 1, wherein the ceramic has a surface area of at least about 150 $m^2$/g.

* * * * *

UNITED STATES PATENT AND TRADEMARK OFFICE
CERTIFICATE OF CORRECTION

PATENT NO. : 6,210,649 B1
DATED : April 3, 2001
INVENTOR(S) : Ying et al.

It is certified that error appears in the above-identified patent and that said Letters Patent is hereby corrected as shown below:

<u>Column 2, claim 1,</u>
Line 41, after "a ceramic" please remove --, the ceramic --.

Signed and Sealed this

Sixteenth Day of October, 2001

*Attest:*

NICHOLAS P. GODICI
*Attesting Officer*      *Acting Director of the United States Patent and Trademark Office*